United States Patent
Zhang et al.

(10) Patent No.: US 9,218,280 B2
(45) Date of Patent: Dec. 22, 2015

(54) NON-VOLATILE MEMORY APPARATUS AND OPERATING METHOD THEREOF

(71) Applicant: VIA Technologies, Inc., New Taipei (TW)

(72) Inventors: Bo Zhang, Beijing (CN); Chen Xiu, Beijing (CN)

(73) Assignee: VIA Technologies, Inc., New Taipei (TW)

( * ) Notice: Subject to any disclaimer, the term of this patent is extended or adjusted under 35 U.S.C. 154(b) by 214 days.

(21) Appl. No.: 13/959,761

(22) Filed: Aug. 6, 2013

(65) Prior Publication Data

US 2014/0223079 A1    Aug. 7, 2014

(30) Foreign Application Priority Data

Feb. 5, 2013    (CN) .......................... 2013 1 0046028

(51) Int. Cl.
*G06F 12/02*    (2006.01)

(52) U.S. Cl.
CPC .... *G06F 12/0246* (2013.01); *G06F 2212/7201* (2013.01)

(58) Field of Classification Search
CPC .................... G06F 12/0246; G06F 2212/7201
USPC .......................................................... 711/103
See application file for complete search history.

(56) References Cited

U.S. PATENT DOCUMENTS

| 2005/0055532 A1* | 3/2005 | Yu .................................. 711/203 |
| 2007/0300037 A1* | 12/2007 | Rogers et al. ................. 711/202 |
| 2010/0332730 A1* | 12/2010 | Royer et al. .................. 711/103 |
| 2012/0054419 A1* | 3/2012 | Chen et al. .................... 711/103 |

FOREIGN PATENT DOCUMENTS

| CN | 101794261 | 8/2010 |
| CN | 101930404 | 12/2010 |
| TW | 200929238 | 7/2009 |

OTHER PUBLICATIONS

"Office Action of Taiwan Counterpart Application", issued on Mar. 9, 2015, p. 1-p. 14.

* cited by examiner

*Primary Examiner* — Mark Giardino, Jr.
(74) *Attorney, Agent, or Firm* — Jianq Chyun IP Office

(57) ABSTRACT

A non-volatile memory (NVM) apparatus and an operation method thereof are provided. A mapping table in a main memory is divided into a plurality of sub-mapping tables according to logical address groups. When an access command of a host is processed by the NVM apparatus, at least one corresponding sub-mapping table is selected from the sub-mapping tables according to a logical address of the access command. If the at least one corresponding sub-mapping table is required to be rebuilt, then the at least one corresponding sub-mapping table is rebuilt, and the logical address of the access command is converter for accessing the NVM apparatus according to the at least one corresponding sub-mapping table which has been rebuilt.

20 Claims, 5 Drawing Sheets

NON-VOLATILE MEMORY APPARATUS AND OPERATING METHOD THEREOF

CROSS-REFERENCE TO RELATED APPLICATION

This application claims the priority benefit of China application serial no. 201310046028.4, filed on Feb. 5, 2013. The entirety of the above-mentioned patent application is hereby incorporated by reference herein and made a part of this specification.

BACKGROUND

1. Technical Field

The disclosure relates to a memory apparatus or storage apparatus, and more particularly to a non-volatile memory apparatus and an operating method thereof.

2. Related Art

When using a solid state disk/drive (SSD) or a flash memory, a mapping table is required for recording the mapping relationship between the logical addresses and the physical addresses. Usually, the host accesses the data stored in the SSD or the flash memory apparatus according to a mapping mode, such as the Page Mapping, the Block Mapping, the Replacement Block or the Log Block.

Although the contents stored in the mapping table corresponding to the different mapping modes may be different, when an access command from the host is received by the SSD or the flash memory apparatus, the SSD or the flash memory apparatus converts the logical address of the access command to the physical address of the flash memory in the SSD or the flash memory apparatus according to the mapping table, so as to execute the access command to the physical page indicated by the converted physical address.

In the process of continuously executing the numerous access commands from the host, the correspondence relationship between the logical addresses and the physical addresses may be varied correspondingly, so the contents in the mapping table may be updated continuously. Normally, the mapping table is stored in the dynamic random access memory (DRAM), so as to enhance the access speed. When a power-off process is performed by the SSD, the mapping table will be stored into the flash memory of the SSD in order to make sure that the contents of the mapping table are not lost due to the power-off. In addition, when the power is provided to the SSD, the SSD executes the initial process. During the initial process, the mapping table is read from the flash memory and written to the DRAM by the SSD.

However, when an abnormal power-off event is occurred at the SSD, since the mapping table is unable to be written into the flash memory, the contents of the mapping table will be lost. Further, when the power is provided to the SSD again after the abnormal power-off event, since the contents of the mapping table are lost, the conventional SSD is required to rebuild the mapping table in the initial process. During the process of rebuilding the mapping table, the SSD needs to scan all the flash memory chips in the SSD, to scan all the physical blocks in the flash memory chips, and further to scan all the physical pages in the physical blocks, so as to rebuild the mapping table. After the rebuilding of the mapping table is completed, the SSD ends the initial process and enters into a normal operation mode.

The larger the memory capacity, the more the contents of the mapping table are. As the result, the time spent on rebuilding the mapping table will be longer as well. Some SSDs with large storage capacity even spend more than 30 minutes for rebuilding the whole mapping table. Therefore, when providing the power to the SSD after the abnormal power-off event, the conventional SSD spends large amount of time on rebuilding the mapping table and executing the initial process, and the access command of the host will be detained for a while and responded after a specific time period.

SUMMARY

The disclosure provides a non-volatile memory (NVM) apparatus and an operating method thereof, such that the startup speed of the NVM apparatus is improved when the NVM apparatus is power-on after the abnormal power-off.

An embodiment of the present disclosure provides an operation method of an NVM apparatus. The operation method includes the following steps. A plurality of logical addresses is grouped into a plurality of logical address groups. According to the logical address groups, a mapping table stored in a main memory of the NVM apparatus is divided into a plurality of sub-mapping tables. When an access command of a host is processed by the NVM apparatus, the NVM apparatus selects at least one corresponding sub-mapping table from the sub-mapping tables according to a logic address of the access command. If the at least one corresponding sub-mapping table is required to be rebuilt, then the at least one corresponding sub-mapping table is rebuilt. The logical address of the access command is converted to access a non-volatile storage unit of the NVM apparatus according to the at least one corresponding sub-mapping table which has been rebuilt.

An embodiment of the present disclosure provides an NVM apparatus including a main memory, a non-volatile storage unit and a controller. The controller is coupled to the main memory and the non-volatile storage unit. The controller groups a plurality of logical addresses to a plurality of logical address groups and divides a mapping table stored in the main memory to a plurality of sub-mapping tables according to the logical address groups. When an access command of a host is processed by the controller, the controller selects at least one corresponding sub-mapping table from the sub-mapping tables according to a logical address of the access command. If the at least one corresponding mapping table is required to be rebuilt, the controller rebuilds the at least one corresponding mapping table, and further converts the logical address of the access command according to the at least one corresponding sub-mapping table which has been rebuilt to access the non-volatile storage unit.

Based on the above, the NVM apparatus and the operation method thereof provided in the disclosure divide the mapping table to a plurality of the sub-mapping tables according to the logical address groups. When a power-on is occurred after an abnormal power-off, the NVM apparatus and the operation method thereof may suspend the rebuilding of the entire mapping table or select a portion of the sub-mapping tables for rebuilding. When the access command of the host is received by the NVM apparatus, if the sub-mapping table belongs to the logical address of the access command is the sub-mapping table required to be rebuilt, the NVM apparatus rebuilds the sub-mapping table corresponding to the access command rather than rebuilds the entire mapping table in once. Since the size of each of the sub-mapping tables may be far less than the size of the entire mapping table, the NVM apparatus and the operation method thereof provided in the disclosure is capable of improving the startup speed of the NVM apparatus in the power-on process after the abnormal power-off event is occurred.

In order to make the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
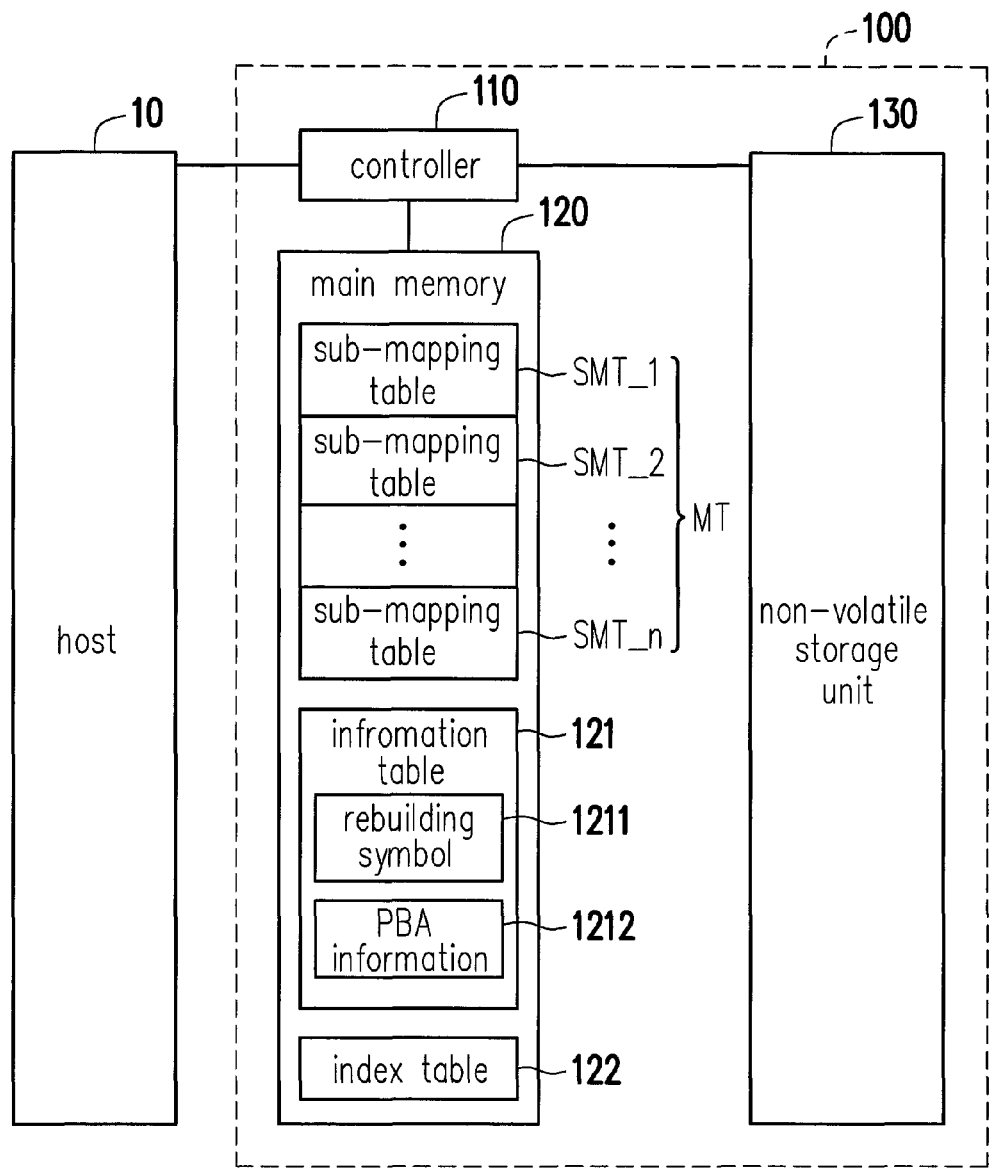
FIG. 1 is a schematic diagram illustrating a circuit block of a non-volatile memory apparatus according to an embodiment of the disclosure.

The terms "connected," "coupled," and "mounted" and variations thereof herein (including the claims) are used broadly and encompass direct and indirect connections, couplings, and mountings. For example, if the disclosure describes a first apparatus being coupled to a second apparatus, then the first apparatus can be directly connected to the second apparatus, or the first apparatus can be indirectly connected to the second apparatus through other devices or by a specific coupling means. Wherever possible, the same reference numbers are used in the drawings and the description to refer to the same or like parts. The components/parts/steps using the same reference numerals or using the same terminology in the different embodiments can get cross-reference instructions.

FIG. 1 is a schematic diagram illustrating a circuit block of a non-volatile memory (NVM) apparatus 100 according to an embodiment of the disclosure. The NVM apparatus 100 is coupled to a host 10. The NVM apparatus 100, for example, may be a Personal Computer Memory Card International Association card (PCMCIA card), a compact flash card (CF card), a smart media card (SM or SMC), a memory stick, a multimedia card (e.g. MMC, RS-MMC or MMC-micro), a security card (e.g. SD, miniSD, microSD or SDHC), an universal flash storage apparatus (UFS apparatus) or a solid state disk/drive (SSD). The NVM apparatus 100 may be employed for storing the audio data, the image data or/and the video data in accordance with the various application situation.

The host 10, for example, may be a computer, a portable electronic apparatus or other electronic apparatuses. To be more specific, the host 10 may be a personal computer (PC), a laptop computer, a personal digital assistant (PDA), a portable media player (PMP), a MPEG-1 Audio Layer 3 player (MP3 player), a smart phone, a digital camera, a camcorder, an audio recorder, a game console, a fax machine, a scanner or a printer.

The host 10 and the NVM apparatus 100 may be effectively coupled together by using one of the standard interfaces. For instance, the standard interface may be a small computer system interface (SCSI), a serial attached SCSI (SAS), an Enhanced Small Disk Interface (ESDI), a serial advanced technology attachment (SATA), a peripheral component interconnect express (PCI-express), an integrated drive electronics (IDE), an universal serial bus (USB) or a Thunderbolt. The interface structure between the host 10 and the NVM apparatus 100 is not limited in the present disclosure.

The NVM apparatus 100 includes a controller 110, a main memory 120 and a non-volatile storage unit 130. The controller 110 is coupled to the host 10 through the standard interface mentioned above. The controller 110 is also coupled to the main memory 120 and the non-volatile storage unit 130. The main memory 120 includes a mapping table MT, an information table 121 and an index table 122. The controller 110 of the NVM apparatus 100 converts a logical address of an access command of the host 10 to a physical address of the non-volatile storage unit 130 according to the mapping table MT in the main memory 120.

The main memory 120, for example, may be a dynamic random access memory (DRAM), a static random access memory (SRAM) or other volatile memories. The non-volatile storage unit 130, for example, may be a flash memory.

Figure 2:
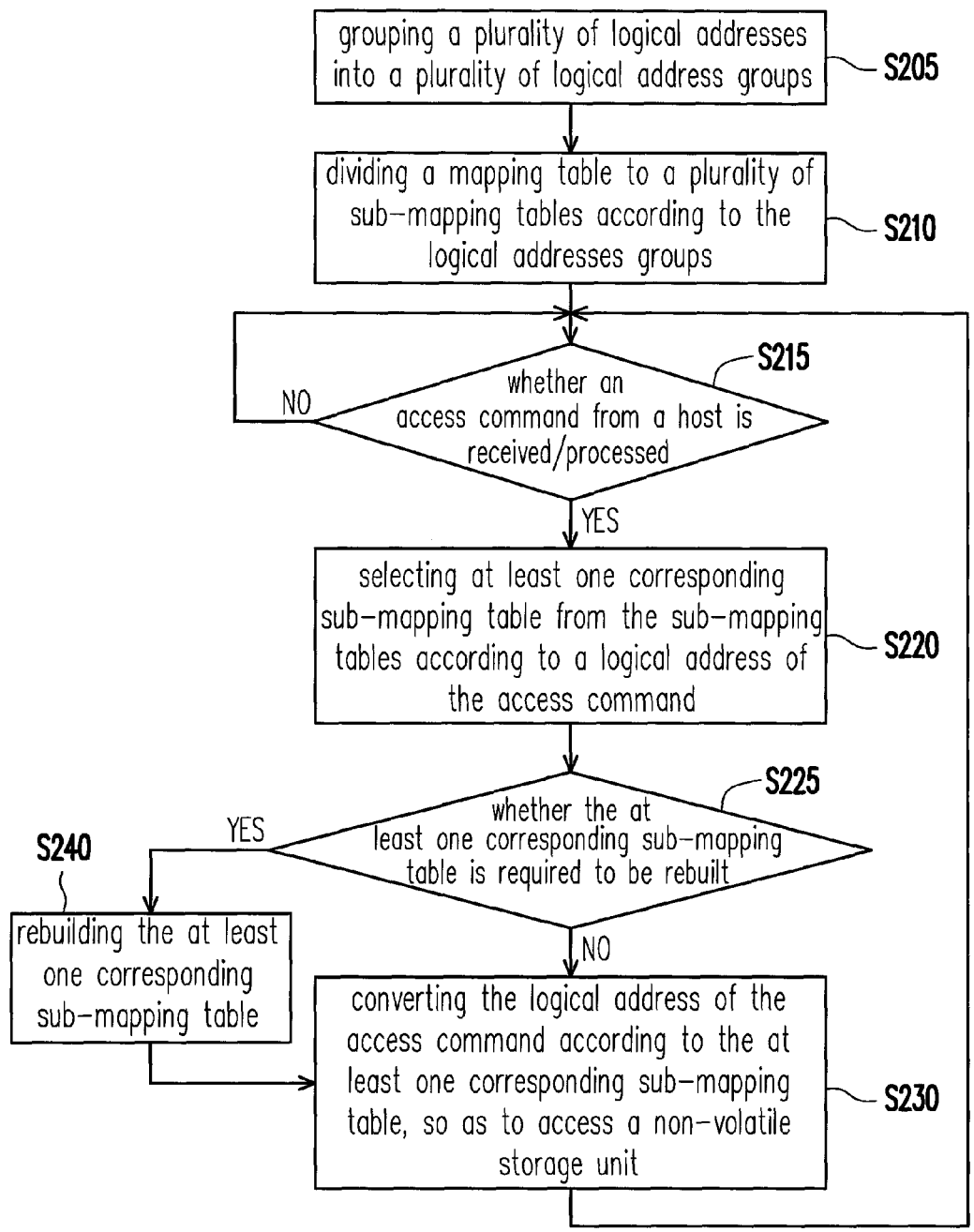
FIG. 2 is a schematic diagram illustrating an operation method of the non-volatile memory apparatus shown in FIG. 1 according to an embodiment of the disclosure.

FIG. 2 is a schematic diagram illustrating an operation method of the non-volatile memory apparatus 100 shown in FIG. 1 according to an embodiment of the disclosure. Referring to FIGS. 1 and 2, the step S205 is executed by the controller 110, so as to group/divide a plurality of logical addresses of the host terminal, like logical block addresses (LBAs), into a plurality of logical address groups (Stripes). For instance, assuming there are 10000 logical addresses. Those logical addresses are divided into 400 logical address groups in step S205, and each of the logical address groups respectively has 25 logical addresses. The numbers of the logical address and the logical address group may be varied according to the design requirement.

Also, the method of grouping the logical addresses may be varied depending on the practical design requirement. In some embodiments, the logical addresses are divided into different groups according to the sequence of the logical addresses. For example, if each of the logical address groups may respectively contain 30 logical addresses, then the logical addresses 0~29 are divided into the logical address group 0 (Stripe 0), the logical addresses 30~59 are divided into the logical address group 1 (Stripe 1), and the rest of logical addresses are divided into the corresponding logical address groups that may be deduced from above description. In some embodiments, the logical addresses are divided into different groups in a discontinuous manner in step S205 with the consideration of wear-leveling. For example, assuming there are 10000 logical addresses, those logical addresses are divided into 400 logical address groups, and each of the logical address groups may contain 25 logical addresses. Therefore, in step S205, the logical addresses 0, 400, 800, 1200, 1600, etc. are divided into logical address group 0 (Stripe 0), the logical addresses 1, 401, 801, 1201, 1601, etc. are divided into logical address group 1 (Stripe 1), and the rest of logical addresses are divided into the corresponding logical address groups that may be deduced from above description. At last, the logical addresses 399, 799, 1199, 1599, 1999, etc. are divided into logical address group 399 (Stripe 399). Further, in some other embodiments, a hash function is employed for grouping the logical addresses into different groups.

Assuming that the host terminal is a FAT (File Allocation Table) file system, the hotter data is usually written in the lower LBA, and the colder data is usually written in the higher LBA, so as to avoid centralizing the hot data in physical blocks of the non-volatile storage unit 130 corresponding to a specific logical address group (Stripe) and to meet the requirement on improving operation efficiency and wear-leveling. In some embodiments, the LBAs which are predetermined to be cold may be centralized in some logical address groups, and the LBAs which are predetermined to be hot may be centralized in some other logical address groups. In comparing to the cold LBAs, lots of resource is provided to the hot LBAs in order to improve the operation efficiency.

The step S210 is executed by the controller 110, so as to divide the mapping table MT stored in the main memory 120 into a plurality of sub-mapping tables, such as the n mapping tables SMT_1, SMT_2 . . . and SMT_n shown in FIG. 1 according to the logical address groups obtained in step S205. When the logical addresses of the host terminal is divided to a plurality of groups, the mapping table MT may be divided to a plurality of sub-mapping tables SMT_1 to SMT_n according to those groups. Each of the sub-mapping tables may be regarded as an isolated mapping table. The LBAs respectively belong to the sub-mapping tables and do not overlap with each other, and the corresponding physical block addresses (PBAs) do not overlap with each other as well. After grouping the logical addresses into different groups in step S205, the logical addresses corresponding to each of the sub-mapping tables are fixed, but the corresponding physical addresses may be dynamically allocated. All the free blocks in the non-volatile storage unit 130 which have not been allocated are put in a free block pool. When an additional physical block is required by a specific sub-mapping table, the controller 110 applies a free block from the free block pool for that sub-mapping table. The process of applying a free block from the free block pool is in accordance with wear-leveling.

The information of the sub-mapping tables SMT_1 to SMT_n, such as time stamp, PBA information 1212, a rebuilding symbol 1211 for indicating whether the sub-mapping table is required to be rebuilt, is stored in the data structure of the information table 121 in the main memory 120. The PBA information 1212 is the information about which physical block addresses (PBAs) belong to the sub-mapping table. The backup information, like the information about whether the corresponding sub-mapping table is "dirty" and the physical addresses where those sup-mapping tables are stored in, is stored in the index table 122 of the main memory 120. Herein, the information table 121, the index table 122 and the mapping table MT may be updated immediately in compliance with the access operation of the host 10, but the main memory 120 is a volatile storage unit, so the content stored in the main memory 120 is lost when the power-off event is occurred. Therefore, the controller 110 copies the information table 121, the index table 122 and the mapping table MT to the non-volatile storage unit 130 as the backup at regular intervals or before the normal power-off. The index table 122 is configured to immediately record whether each of the sub-mapping tables SMT_1 to SMT_n in the mapping table MT copied to the non-volatile storage unit 130 as the backup is updated in the following access operation. In other words, the index table 122 immediately records whether the corresponding sub-mapping table is "dirty". Further, the relative information, such as the physical addresses of the non-volatile storage unit 130 used for storing the recent sub-mapping tables as the backup, is also recorded by the index table 122. When the NVM apparatus is powered to execute the initial process again, the controller 100 loads the sub-mapping tables SMT_1 to SMT_n from the non-volatile storage unit 130 to the main memory 120 according to the related information of the index table 122.

Within the normal power-off condition, the NVM apparatus 100 executes a normal power-off process, so as to store the information table 121, the index table 122 and the mapping table MT to the non-volatile storage unit 130. Thus, when the NVM apparatus is powered again to execute the initial process, the controller 110 reads the information table 121, the index table 122 and the mapping table MT from the non-volatile storage unit 130, and then the information table 121, the index table 122 and the mapping table MT are stored into the main memory 120 by the controller 110. However, within the abnormal power-off condition, the controller 110 needs to rebuild all the tables in the main memory 120 including the mapping table MT, the index table 122 and the information table 121.

To the controller 110, several methods are available for determining whether the latest power-off event is normal or not. For example, a power-off symbol in the non-volatile storage unit 130 may be employed by the controller 110 to determine whether an abnormal power-off event is occurred at the NVM apparatus 100. When the NVM apparatus 100 is successfully activated (regardless to whether the NVM apparatus 100 is activated after a normal power-off or an abnormal power-off), the controller 100 writes an activation complete symbol into the non-volatile storage unit 130. Further, when the normal power-off process is performed by the NVM apparatus 100, a power-off complete symbol is written into the non-volatile storage unit 130 by the controller 110. The activation complete symbol and the power-off complete symbol are regarded as the power-off symbol. During the next activation, the controller 110 will search for the latest power-off symbol. If only the activation complete symbol is found by the controller 110 (the power-off complete symbol is absent), the controller 110 determines that the latest power-off event is an abnormal power-off event. In another method, when the normal power-off process is performed by the NVM apparatus 100, the controller 100 writes the power-off symbol into the non-volatile storage unit 130. When the NVM apparatus 100 is powered to execute the initial process, the controller 110 will erase the power-off symbol in the non-volatile storage unit 130 after reading the power-off symbol in the non-volatile storage unit 130. Since once the abnormal power-off event is occurred at the NVM apparatus 100, the controller 110 is unavailable to write the power-off symbol into the non-volatile storage unit 130. Therefore, the controller 110 determines whether the latest power-off event is the normal power-off event according to whether the power-off symbol is stored in the non-volatile storage unit.

Referring to FIG. 2, an embodiment is provided for illustrating the "rebuilding" process. In step S215, the access command from the host 10 is received or/and processed by the controller 110. When the access command of the host 10 is processed by the controller 110, the controller 110 selects at least one corresponding sup-mapping table from the sub mapping tables SMT_1~SMT_n according to the LBA (or the LBAs) of the access command of the host 10 (Step S220) and determines whether the at least one corresponding sub-mapping table is required to be rebuilt or not (Step S225). For instance, assuming the logical addresses 0, 400, 800, 1200, etc. are divided into sub-mapping table SMT_1 and the logical addresses 1, 401, 801, 1201, etc. are divided into the sub-mapping table SMT_2 in steps S205 and S210, if the LBA of the access command is 801, a hash calculation is performed on LBA in step S220 to recognize that the LBA is in the sub-mapping table SMT_2, and step S225 is performed to determine whether the sub-mapping table SMT_2 is required to be rebuilt.

Several methods may be employed by the controller 110 to determine whether the sub-mapping tables SMT_1 to SMT_n are required to be rebuilt. For example, the rebuilding status of each of the sub-mapping tables is recorded by a rebuilding symbol 1211 in the information table 121, so the controller 110 determines whether the sub-mapping table selected in step S220 is required to be rebuilt according to the content of the information table 121 in step S225. However, when the abnormal power-off event is occurred at the NVM apparatus 100, the content of the information table 121 may also be lost. When the NVM apparatus 100 is powered again after the power-off event, the controller 100 executes the initial process. Within the initial process, the controller 110 determines whether the power-off event is the abnormal power-off or not. If the power-off event is the normal power-off, the controller 110 reads the information table 121 from the non-volatile storage unit 130 and writes the information table 121 back to the main memory 120 in the initial process. If the power-off event is the abnormal power-off, the information table 121 is required to be rebuilt firstly. The detailed description of the initial process is described below with the reference FIG. 5.

If the controller 110 determines that the at least one corresponding sub-mapping table (sub-mapping table selected in step S220, such as the sub-mapping table SMT_2) is unnecessary to be rebuilt in step S225, then the controller 110 executes the step S230, so as to convert the logical address of the access command according to the at least one sub-mapping table for accessing the non-volatile storage unit 130, such as writing the data into the non-volatile storage unit 130 or reading the data from the non-volatile storage unit 130. A page mapping mode is taken as an example for explaining how to convert the logical address in accordance with the sub-mapping table for accessing the non-volatile storage unit 130. The content stored in each of the sub-mapping tables SMT_1 to SMT_n is all the logical page addresses (LPAs) of the LBAs included in the corresponding logical address group (Stripe) and the physical page addresses (PPAs) corresponding to the LPAs. That is to say, the fixed LPAs of each of the sub-mapping table are the indexes, and the dynamically varied PPAs are the entries. When the page mapping is performed for processing the write or read command of the host 10, the LBA of the write or read command from the host 10 is analyzed to obtain the LPA for writing or reading, and the corresponding sub-mapping table is retrieved or/and updated for accomplishing the write or read operation of the related physical pages.

If the controller 110 determines that the at least one corresponding sub-mapping table (the sub-mapping table selected in step S220) is required to be rebuilt, then the controller 110 executes the step S240 in order to rebuild the at least one corresponding sub-mapping table. After the step S240 is complete, the step S230 is then executed by the controller 110, so as to convert the logical address of the access command according to the at least one corresponding sub-mapping table for accessing the non-volatile storage unit 130.

In other words, if the access command transmitted form the host 10 is corresponding to a sub-mapping table which has not been rebuilt, the controller 110 only needs to rebuild the sub-mapping table corresponding to the access command in the main memory instead of rebuilding the entire mapping table MT. Since the number of the physical blocks covered by one sub-mapping table (corresponding to one sub-mapping table) is limited, the speed of rebuilding is relatively fast.

After the rebuilding of the sub-mapping table corresponding to the access command is complete, the corresponding rebuilding symbol 1211 in the information table 121 is set to be "no requirement on rebuilding" by the controller 100. If the access command of the host 10 is intended to access the sub-mapping table which has already been rebuilt, then no rebuilding process is required, and the response speed of the NVM apparatus 100 in responding to the access command of the host 10 is improved.

If the access command transmitted from the host 10 is long enough to cover the sub-mapping table which has already been rebuilt and the sub-mapping table which has not been rebuilt, then the rebuilding process is performed to the sub-mapping table which has not been rebuilt, so as to execute step S230.

Figure 3:
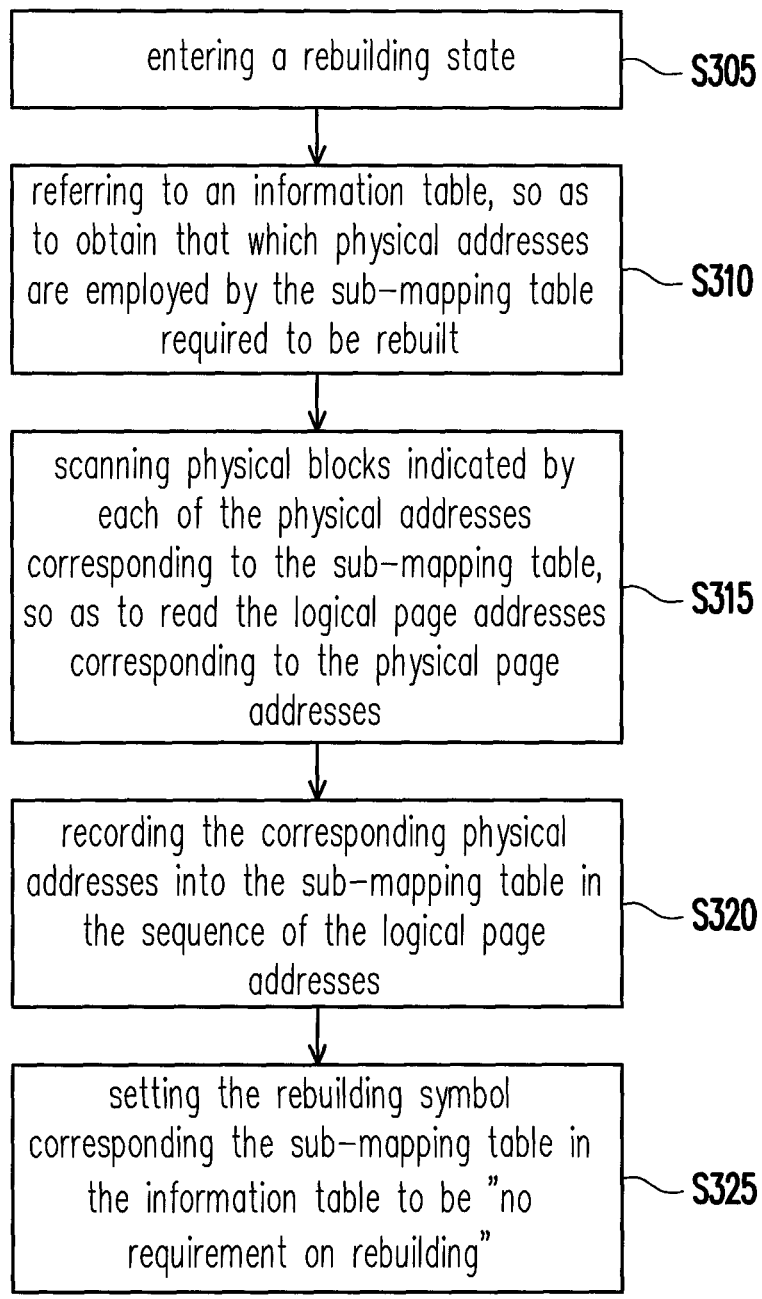
FIG. 3 is a schematic diagram illustrating a method of rebuilding a sub-mapping table by the non-volatile memory apparatus shown in FIG. 1 according to an embodiment of the disclosure.

A description for showing how to rebuild a specific sub-mapping table in step S240 is described below with the reference FIG. 3.

In step S305, the index table 122 is firstly reset by the controller 110, so as to enter a rebuilding state. In the following description, the access command transmitted from the host 10 is assumed to be the access command corresponding to the sub-mapping table SMT_1. That is to say, the following description is related to a rebuilding process of the sub-mapping table SMT_1. The rebuilding process of the sub-mapping tables SMT_2 to SMT_n may be deduced by referring the related description of rebuilding the sub-mapping table SMT_1.

In step S310, the information table 121 is referred to by the controller 110, so as to obtain that which physical addresses are employed by the sub-mapping table SMT_1. A situation is that, the number of the physical address corresponding to the sub-mapping table SMT_1 in the information table 121 is 0. That is to say, the logical region corresponding to the sub-mapping table SMT_1 has never been written before, so the flow in FIG. 3 may be directly ended. Next, in the step S315, the physical blocks (PB) indicated by each of the physical addresses corresponding to the sub-mapping table SMT_1 are scanned by the controller 110, so as to read the logical page addresses corresponding to the physical page addresses from the spare areas of physical pages in the physical blocks. In an example of applying page mapping algorithm to the entire non-volatile storage unit 130, the controller 110 scans the spare area of each physical page of each of the physical blocks corresponding to the sub-mapping table SMT_1. The logical page addresses (LPAs) corresponding to the physical page addresses (PPAs) of each of the physical pages are dispersedly stored in the spare areas of those physical pages, and the time stamps of writing those LPAs are also stored in the spare areas of those physical pages. Therefore, by scanning the spare areas, the LPAs corresponding to the PPA and the sequence of writing the LPAs are obtained.

Next, in the step S320, the controller 110 records the physical page addresses (LPAs) into the sub-mapping table SMT_1 in the sequence of the logical page addresses to rebuild the sub-mapping table SMT_1. The page mapping algorithm is still used in the process described below as an example. Since the LPAs corresponding to the PPAs are already obtained, the sub-mapping table SMT_1 may be rebuilt by storing each of the PPAs corresponding to each of the LPAs into the sub-mapping table SMT_1 in the sequence of writing the LPAs into the original sub-mapping table SMT_1. In another embodiment, the process of updating the sub-mapping table SMT_1 may not follow the sequence of writing the LPAs into the original sub-mapping table SMT_1, but follows an arbitrary sequence. When each time the LPA corresponding to the PPA is updated into the sub-mapping table SMT_1, the mapping between the LPA and the PPA is checked to determine whether the LPA has newer time stamp compared with LPA already stored in the sub-mapping table SMT_1. If the LPA already stored in the sub-mapping table SMT_1 has the older time stamp, then the rebuilt entry of the PPA to the LPA is employed to substitute the old entry in the sub-mapping table SMT_1. When all the physical blocks employed by the sub-mapping table are updated once, then the rebuilding of the sub-mapping table is complete. In other words, the rebuilding of the sub-mapping table SMT_1 is finished by the controller 110. Within the rebuilding process, the index table 122 is also updated by the controller 110 to be a newest status. Finally, in step S325, the rebuilding symbol 1211 corresponding to the sub-mapping table SMT_1 in the information table 121 is set to be "no requirement on rebuilding".

In another embodiment, the controller 110 scans the last physical page of each physical block, and the LPAs of all the physical pages in the physical block is stored in the last physical page. If all the physical pages in the physical page have already been written once, instead of scanning each spare area of each physical page, the controller 110 could only scan the last physical page in order to save time. To be more specific, in step S310, the information table 121 is retrieved by the controller 110, so as to obtain the physical page addresses used by the sub-mapping table SMT_1. In step S315, the physical blocks indicated by the physical addresses corresponding to the sub-mapping table SMT_1 are scanned by the controller 110, so as to read the logical page addresses (LPAs) corresponding to the physical page addresses (PPAs) from the last physical pages of the physical blocks. In step S320, the controller 110 records the corresponding physical page addresses into the sub-mapping table SMT_1 in the sequence of the logical page addresses to rebuild the sub-mapping table SMT_1. Last, in step S325, the rebuilding symbol 1211 of the sub-mapping table SMT_1 in the information table 121 is set to be "no requirement on rebuilding".

Based on the above description, the NVM apparatus 100 and the operation method thereof provided in the present embodiment divide the mapping table MT to a plurality of sub-mapping tables SMT_1 to SMT_n according to the logical address groups obtained in step S205. When the NVM apparatus 100 is power-on again after the power-off, the NVM apparatus 100 and the operation method thereof temporarily suspend the rebuilding of the entire mapping table MT. When the access command of the host 10 is received or/and processed by the NVM apparatus 100, if the sub-mapping table (such as SMT_2) which belongs to the logical address indicated by the access command is required to be rebuilt, then the controller 110 of the NVM apparatus 100 only rebuilds the sub-mapping table SMT_2 corresponding to the access command in the main memory 120 rather than rebuilds the entire mapping table MT in once. Since the size of each sub-mapping table is much more smaller than the size of the entire mapping table MT, when the NVM apparatus is power-on again after the abnormal power-off, the NVM apparatus 100 and the operation method thereof provided in the present embodiment may improve the speed of the NVM apparatus 100 responding to the access command of the host 100.

Figure 4:
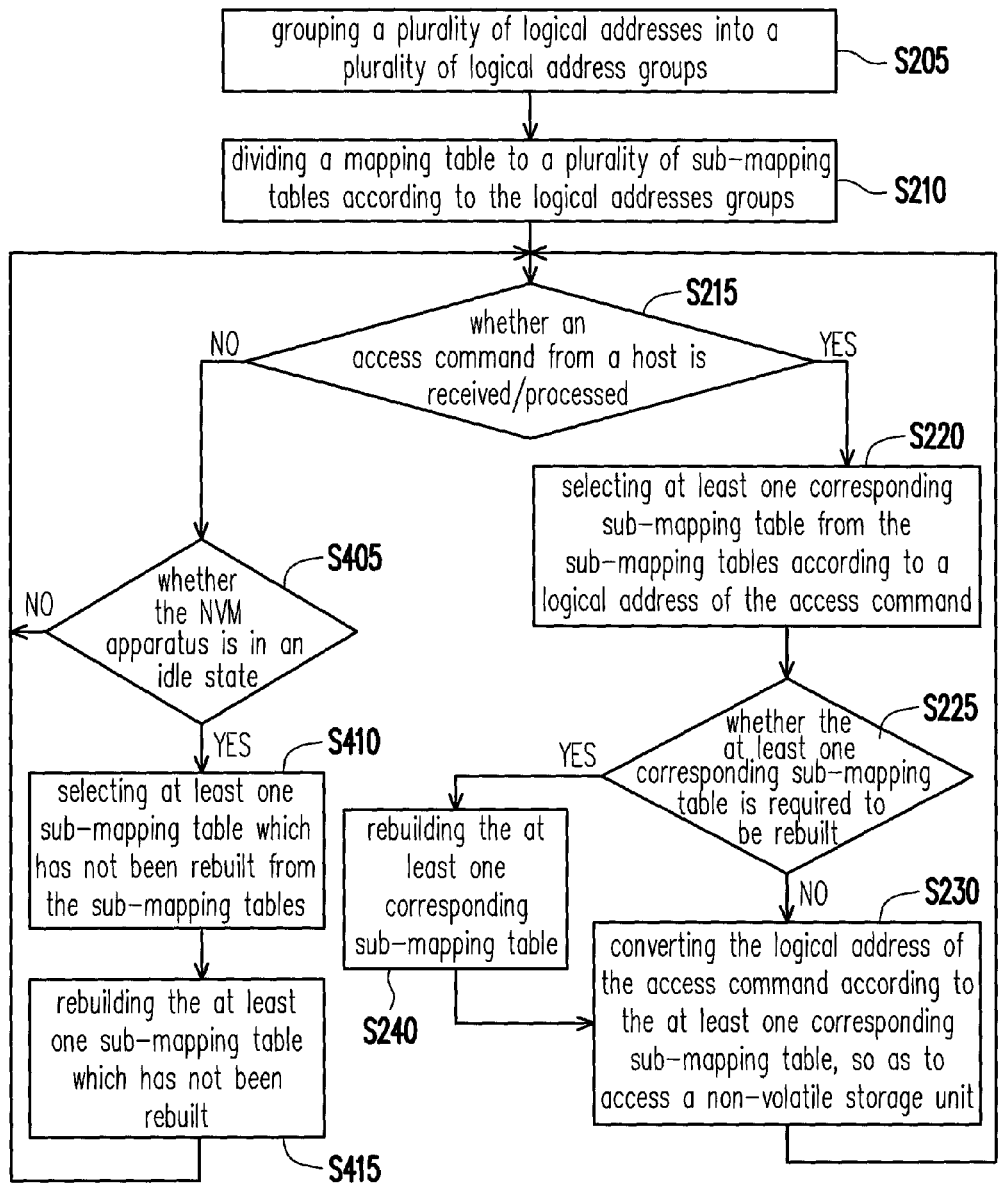
FIG. 4 is a schematic diagram illustrating an operation method of the non-volatile memory apparatus shown in FIG. 1 according to another embodiment of the disclosure.

FIG. 4 is a schematic diagram illustrating an operation method of the non-volatile memory apparatus shown in FIG. 1 according to another embodiment of the disclosure. The embodiment shown by FIG. 4 is described with reference to the related description of FIG. 2. The difference between the embodiment of FIG. 2 and the embodiment of FIG. 4 is that, if the determination in step S215 is no (no access command from the host), then the controller 110 of the NVM apparatus 100 executes the steps S405, S410 and/or S415. Referring to FIGS. 1 and 4, in step S405, the controller 110 determines whether the NVM apparatus 100 is in an idle state or not. When the NVM apparatus 100 is in the idle state, then the information table 121 is referred to by the controller 110, so as to select at least one sub-mapping table which has not been rebuilt and is required to be rebuilt from the sub-mapping tables SMT_1~SMT_n (step S410). Next, the at least one sub-mapping table which has not been rebuilt and selected in step S410 is rebuilt by the controller 110 (step S415). The detail of rebuilding the sub-mapping table in step S415 may be deduced by referring the related description of FIG. 3.

The method of selecting the sub-mapping table and the number of the sub-mapping table in step S410 are not limited in the present embodiment. For instance, one or more sub-mapping tables may be randomly selected or may be selected in another manner by the controller 110 from the sub-mapping tables have not been rebuilt, so as to execute the rebuilding process.

The operation of rebuilding the sub-mapping table in FIG. 4 is not only performed when receiving the access command from the host 10 and requiring to convert the logical address to the physical address according to the mapping table MT. When the host 10 and the NVM apparatus 100 is in the idle state, the operation of rebuilding the sub-mapping table may be actively performed.

Figure 5:
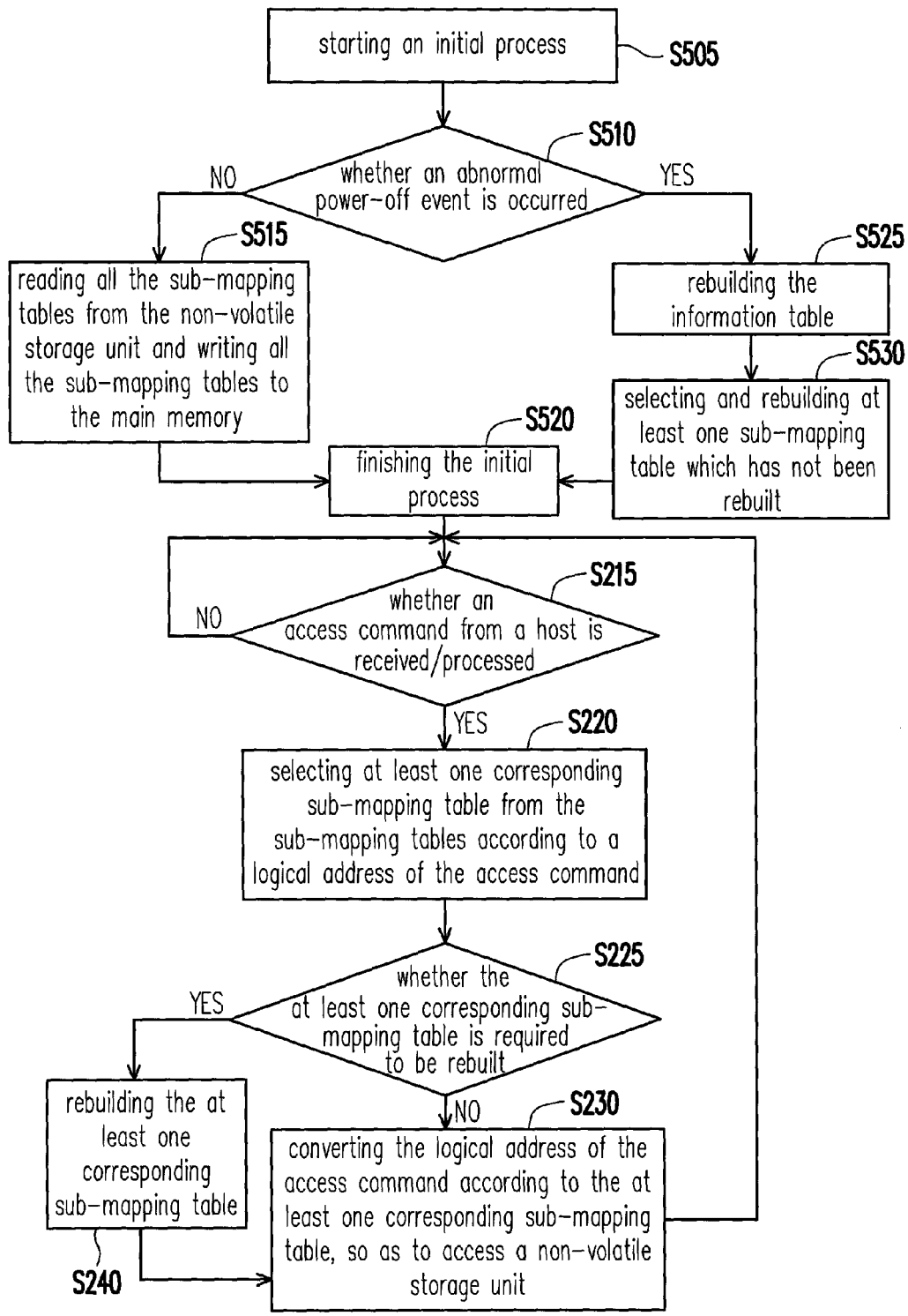
FIG. 5 is a schematic diagram illustrating an operation method of the non-volatile memory apparatus shown in FIG. 1 according to still another embodiment of the disclosure.

FIG. 5 is a schematic diagram illustrating an operation method of the NVM apparatus 100 shown in FIG. 1 according to still another embodiment of the disclosure. The embodiment shown by FIG. 5 is described with reference to the related description of FIG. 2. The difference between the embodiment of FIG. 2 and the embodiment of FIG. 5 is that, the embodiment shown in FIG. 5 further includes the steps S505, S510, S515, S520, S525 and S530. Referring to FIGS. 1 and 5, when the NVM apparatus 100 is powered again after a power-off event, the NVM apparatus 100 executes the initial process (step S505). The controller 110 determines whether the power-off event is an abnormal power-off or not in step S510. If the determination in step S510 indicates that the power-off event is the normal power-off, then the controller 110 reads the information table 121, the index table 122 and all the sub-mapping tables SMT_1 to SMT_n from the non-volatile storage unit 130 in the initial process, and the information table 121, the index table 122 and all the sub-mapping tables SMT_1 to SMT_n are written into the main memory 120 (step S515). After the step S515 is complete, the NVM apparatus 100 finishes the initial process (step S520). After the initial process is complete, the controller 110 then executes the steps S215 to S240 described in the related description of FIG. 2.

If the determination in step S510 indicates that the power-off event is the abnormal power-off, the controller 110 rebuilds the information table 121 in the initial process (step S525). Specifically, the process of rebuilding the information table 121 includes rebuilding the rebuilding symbol 1211 and the PBA information 1212.

The following description is related to the process of rebuilding the rebuilding symbol 1211 in the main memory 120. If the determination in step S510 indicates that the power-off event is the abnormal power-off, then all the rebuilding symbols 1211 are set to be the status that all the sub-mapping tables SMT_1 to SMT_n are "required for rebuilding" by the controller 110. That is to say, when the abnormal power-off event is detected, the controller 110 will rebuild the entire mapping table MT. In the initial process shown in another embodiment, when the power-off event is determined to be the abnormal power-off by the controller 110, instead of setting all the rebuilding symbols 1121 of the sub-mapping tables SMT_1 to SMT_n to be the "rebuilding required" status, each of the sub-mapping tables loading from the non-volatile storage unit 130 is determined whether it is valid or not. For example, the controller 110 may determine whether each of the sub-mapping table loading from the non-volatile storage unit 130 is valid or not according to the time stamp where the power-off event is occurred. If the sub-mapping table is valid, then the rebuilding symbol 1211 corresponding to the sub-mapping table in the information table 121 is set to be "no requirement on rebuilding".

The following description is related to the process of rebuilding the PBA information 1212 in the main memory 120. If the determination in step S510 indicates that the power-off event is the abnormal power-off, then the first physical page of each physical block in the non-volatile storage unit 130 is scanned by the controller 110. According to the information in the spare area of the first physical page, the controller 110 recognizes that each physical block belongs to which sub-mapping table, so as to rebuild the PBA information 1212 of the information table 121 (i.e. the information about which physical blocks each of sub-mapping tables SMT_1 to SMT_n contains). If a specific physical block is the free block, then the physical block is stored in the free block pool.

When the rebuilding of the information table 121 is complete, the information table 121 may be referred to by the controller 100 in the initial process, so as to select at least one sub-mapping table which has not been rebuilt and is required to be rebuilt from the sub-mapping tables SMT_1~SMT_n and rebuild the selected sub-mapping table (step S530). After the step S530, the NVM apparatus 100 finishes the initial process (step S520).

The method of selecting the sub-mapping table and the number of the sub-mapping tables in step S530 are not limited in the present embodiment. For instance, one or more sub-mapping tables may be randomly selected or may be selected in another manner by the controller 110 from the sub-mapping tables which have not been rebuilt and are required to be rebuilt, so as to execute the rebuilding process. The number of the sub-mapping table rebuilt in step S530 is determined according to the design requirement of the practical product. For example, the number of the sub-mapping table planned to be rebuilt in step S530 should be as many as possible under a situation that the time spent for the initial process is within a regulation range. The rest of the sub-mapping tables which have not been rebuilt and are required to be rebuilt are selectively rebuilt in the normal operation process according to the access command of the host 10.

In other words, in the present embodiment, the entire mapping table MT is not rebuilt in once within the initial process. Only a portion of the sub-mapping tables SMT_1 to SMT_n is selected for rebuilding. After the initial process is complete, when the access command of the host 10 is received or/and processed by the NVM apparatus 100, if the sub-mapping table (such as SMT_2) which belongs to the logical address of the access command is required to be rebuilt, then only the sub-mapping table SMT_2 corresponding to the access command is rebuilt by the controller 110 of the NVM apparatus 100 in the main memory 120. Therefore, when the NVM apparatus 100 is powered again after the power-off, the NVM apparatus 100 and the operation method thereof provided in the present embodiment are capable of improving the start-up speed of the NVM apparatus 100. Also, in the initial process of other embodiments, only the information table is rebuilt (step S525), and none of the sub-mapping tables is rebuilt (i.e. step S530 is not executed).

It will be apparent to those skilled in the art that various modifications and variations can be made to the structure of the disclosed embodiments without departing from the scope or spirit of the disclosure. In view of the foregoing, it is intended that the disclosure covers modifications and variations of this disclosure provided they fall within the scope of the following claims and their equivalents.

What is claimed is:

1. An operation method of a non-volatile memory apparatus, comprising:
grouping a plurality of logical addresses into a plurality of logical address groups;
dividing a mapping table in a main memory of the non-volatile memory apparatus into a plurality of sub-mapping tables according to the logical addresses groups;
when an access command of a host is processed by the non-volatile memory apparatus, selecting at least one corresponding sub-mapping table from the sub-mapping tables according to a logical address of the access command by the non-volatile memory apparatus, wherein said at least one corresponding sub-mapping table contains said logical address of the access command;
if the at least one corresponding sub-mapping table containing said logical address of the access command is required to be rebuilt, rebuilding the at least one corresponding sub-mapping table after said at least one corresponding sub-mapping table containing said logical address of the access command is selected and determined to contain said logical address of the access command; and
converting the logical address of the access command according to the at least one corresponding sub-mapping table which has been rebuilt, so as to access a non-volatile storage unit in the non-volatile memory apparatus.

2. The operation method of the non-volatile memory apparatus as claimed in claim 1, wherein if the at least one corresponding sub-mapping table is not required to be rebuilt, the logical address of the access command is converted in order to access the non-volatile storage unit directly according to the at least one corresponding sub-mapping table.

3. The operation method of the non-volatile memory apparatus as claimed in claim 1, wherein each of the logical address group is corresponding to one of the sub-mapping tables, the logical addresses corresponding to each of the logical address groups are fixed, and a plurality of physical blocks of the non-volatile storage unit are dynamically allocated among the plurality of sub-mapping tables.

4. The operation method of the non-volatile memory apparatus as claimed in claim 1, wherein the main memory is a dynamic random access memory, and the non-volatile storage unit comprises a flash memory.

5. The operation method of the non-volatile memory apparatus as claimed in claim 1, further comprising:
determining whether an abnormal power-off event is occurred at the non-volatile memory apparatus according to a power-off symbol of the non-volatile storage unit, wherein a normal power-off event is occurred at the non-volatile memory apparatus if the power-off symbol comprises an activation complete symbol and a power-off complete symbol, and the abnormal power-off event is occurred at the non-volatile memory apparatus if the power-off symbol only comprises the activation complete symbol.

6. The operation method of the non-volatile memory apparatus as claimed in claim 5, further comprising:
writing the power-off complete symbol into the non-volatile storage unit when a normal power-off process is performed by the non-volatile memory apparatus; and
writing the activation complete symbol into the non-volatile storage unit when the non-volatile memory apparatus is powered to execute an initial process.

7. The operation method of the non-volatile memory apparatus as claimed in claim 1, further comprising:
providing an information table, for recording a plurality of rebuilding symbols, and the rebuilding symbols are configured to indicate whether the sub-mapping tables are required to be rebuilt.

8. The operation method of the non-volatile memory apparatus as claimed in claim 7, further comprising:
executing an initial process when the non-volatile memory apparatus is powered again after a power-off event;
determining whether the power-off event is an abnormal power-off event;
if the power-off event is a normal power-off event, reading the information table from the non-volatile storage unit and writing the information table into the main memory; and
if the power-off event is the abnormal power-off event, setting the rebuilding symbols to indicate that the sub-mapping tables are required to be rebuilt.

9. The operation method of the non-volatile memory apparatus as claimed in claim 1, further comprising:
providing an information table, for recording at least one physical address information, wherein the physical address information respectively indicates which physical blocks belong to each of the sub-mapping tables.

10. The operation method of the non-volatile memory apparatus as claimed in claim 9, further comprising:
executing an initial process when the non-volatile memory apparatus is powered again after a power-off event;
determining whether power-off event is an abnormal power-off event during the initial process;
reading the information table from the non-volatile storage unit and writing the information table into the main memory during the initial process if the power-off event is a normal power-off event; and
rebuilding the physical address information in the main memory during the initial process if the power-off event is the abnormal power-off event.

11. The operation method of the non-volatile memory apparatus as claimed in claim 10, wherein the step of rebuilding the physical address information comprises:
scanning a first physical page of each of physical blocks in the non-volatile memory storage unit, so as to recognize that the physical addresses of the physical blocks respectively belongs to which sub-mapping table; and
recording a correspondence relationship between the sub-mapping tables and the physical addresses to be the physical address information.

12. The operation method of the non-volatile memory apparatus as claimed in claim 9, wherein the step of rebuilding the at least one corresponding sub-mapping table comprises:
referring to the information table to obtain at least one corresponding physical address used by the at least one corresponding sub-mapping table;
scanning at least one physical block indicated by the at least one corresponding physical address, so as to read a plurality of logical page addresses corresponding to a plurality of physical page addresses from spare areas of a plurality of physical pages of the at least one physical block;
recording the physical page addresses into the at least one corresponding sub-mapping table by sequence of the logical page addresses; and
setting a rebuilding symbol corresponding to the at least one corresponding sub-mapping table in the information table to be no requirement on rebuilding.

13. The operation method of the non-volatile memory apparatus as claimed in claim 9, wherein the step of rebuilding the at least one corresponding sub-mapping table comprises:
referring to the information table to obtain at least one corresponding physical address used by the at least one corresponding sub-mapping table;
scanning at least one physical block indicated by the at least one corresponding physical address, so as to read a plurality of logical page addresses corresponding to a plurality of physical page addresses from a last physical page of the at least one physical block;
recording the physical page addresses into the at least one corresponding sub-mapping table by sequence of the logical page addresses; and
setting a rebuilding symbol corresponding to the at least one corresponding sub-mapping table in the information table to be no requirement on rebuilding.

14. The operation method of the non-volatile memory apparatus as claimed in claim 1, further comprising:
when the non-volatile memory apparatus is in an idle state, selecting at least one sub-mapping table which has not been rebuilt from the sub-mapping tables; and
rebuilding the at least one sub-mapping table which has not been rebuilt by the non-volatile memory apparatus.

15. A non-volatile memory apparatus, comprising:
a main memory;
a non-volatile storage unit; and
a controller, coupled to the main memory and the non-volatile storage unit, wherein the controller groups a plurality of logical addresses to a plurality of logical address groups and divides a mapping table in the main memory to a plurality of sub-mapping tables according to the logical address groups,
the controller selects at least one corresponding sub-mapping table from the sub-mapping tables according to a logical address of an access command of a host when the access command is processed by the controller, wherein said at least one corresponding sub-mapping table contains said logical address of the access command, and if the at least one corresponding sub-mapping table containing said logical address of the access command is required to be rebuilt, the controller rebuilds the at least one corresponding sub-mapping table after said at least one corresponding sub-mapping table containing said logical address of the access command is selected and determined to contain said logical address of the access command and converts the logical address of the access command to access the non-volatile storage unit according to the at least one corresponding sub-mapping table which has been rebuilt.

16. The non-volatile memory apparatus claimed in claim 15, wherein if the at least one corresponding sub-mapping table is not required to be rebuilt, the controller converts the logical address of the access command to access the non-volatile storage unit directly according to the at least one corresponding sub-mapping table.

17. The non-volatile memory apparatus claimed in claim 15, wherein the main memory is a dynamic random access memory, and the non-volatile storage unit comprises a flash memory.

18. The non-volatile memory apparatus claimed in claim 15, wherein the main memory further comprises an information table, a plurality of rebuilding symbols are recorded in the information table, and the rebuilding symbols respectively indicate whether the sub-mapping tables are required to be rebuilt, the information table further records at least one physical address information, and the physical address information respectively indicates which physical blocks belong to each of the sub-mapping tables.

19. The non-volatile memory apparatus claimed in claim 18, wherein the controller executes an initial process when the non-volatile memory apparatus is powered again after a power-off event, the controller determines whether the power-off event is an abnormal power-off event during the initial process, the controller reads the information table from the non-volatile storage unit and writes the information table into the main memory during the initial process if the power-off event is a normal power-off event, and the controller set the rebuilding symbols to indicate that the sub-mapping tables are required to be rebuilt and rebuild the physical address information in the main memory during the initial process if the power-off event is the abnormal power-off event.

20. The non-volatile memory apparatus claimed in claim 19, wherein the controller scans a first physical page of each of physical blocks in the non-volatile storage unit to recognize that the physical addresses of the physical blocks respectively belongs to which sub-mapping table, and the controller record a correspondence relationship between the sub-mapping tables and the physical addresses to be the physical address information, so as to rebuild the physical address information in the main memory.

* * * * *